United States Patent
Baskfield et al.

(10) Patent No.: US 9,253,974 B2
(45) Date of Patent: *Feb. 9, 2016

(54) WATERFOWL DECOY WITH LIFELIKE FEEDING MOVEMENT

(71) Applicants: Tyler J. Baskfield, Denver, CO (US); Dennis L. McKinney, Morrison, CO (US)

(72) Inventors: Tyler J. Baskfield, Denver, CO (US); Dennis L. McKinney, Morrison, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,193

(22) Filed: Apr. 6, 2015

(65) Prior Publication Data

US 2015/0208642 A1     Jul. 30, 2015

Related U.S. Application Data

(63) Continuation of application No. 13/826,684, filed on Mar. 14, 2013, now Pat. No. 8,997,394.

(51) Int. Cl.
    *A01M 31/06*     (2006.01)
(52) U.S. Cl.
    CPC ........... *A01M 31/06* (2013.01); *Y10T 29/49826* (2015.01)
(58) Field of Classification Search
    CPC .......................................... A01M 31/06
    USPC ..................... 43/2, 3; 446/153–165, 268, 330
    See application file for complete search history.

(56) References Cited

U.S. PATENT DOCUMENTS

| | | | |
|---|---|---|---|
| 1,468,979 | A | 9/1923 | Sherman et al. |
| 2,457,295 | A | 12/1948 | Woodhead |
| 2,591,554 | A | 4/1952 | Kinney et al. |
| 2,814,898 | A | 12/1957 | Fluke et al. |
| 2,903,812 | A | 9/1959 | Lewis |
| 3,434,234 | A | 3/1969 | Watts et al. |
| 3,927,485 | A | 12/1975 | Thorsnes |
| 4,566,214 | A | 1/1986 | McCrory et al. |
| 5,588,898 | A * | 12/1996 | Ooba ........................ A63H 3/12 446/321 |
| 5,930,936 | A | 8/1999 | Parr et al. |
| 6,088,944 | A | 7/2000 | Jones |
| 6,412,209 | B1 | 7/2002 | Kapraly et al. |
| 6,412,210 | B1 | 7/2002 | Horrell |
| 6,553,709 | B1 | 4/2003 | Owen |
| 6,643,971 | B2 | 11/2003 | Daniels |
| 6,845,586 | B1 | 1/2005 | Brock, IV |
| 7,322,144 | B2 | 1/2008 | Brewer et al. |
| 7,634,867 | B2 | 12/2009 | Bill |
| 7,730,656 | B2 | 6/2010 | Hulley |
| 7,841,123 | B2 | 11/2010 | Walker |
| 8,997,394 | B2 * | 4/2015 | Baskfield .............. A01M 31/06 43/3 |
| 2004/0010957 | A1 | 1/2004 | Corbiere |
| 2008/0028664 | A1 | 2/2008 | Anthony |
| 2008/0155878 | A1 | 7/2008 | Myers et al. |
| 2009/0151217 | A1 | 6/2009 | Gregory |
| 2014/0298706 | A1 | 10/2014 | Turner |

* cited by examiner

*Primary Examiner* — Darren W Ark
*Assistant Examiner* — Marc Burgess
(74) *Attorney, Agent, or Firm* — Skaar Ulbrich Macari, P.A.

(57) ABSTRACT

A motorized decoy provides lifelike feeding motion by rotating a decoy head through a full 360 degrees while passing through a longitudinal channel in the decoy body. The decoy body bobs in the water as the decoy head rotates.

20 Claims, 6 Drawing Sheets

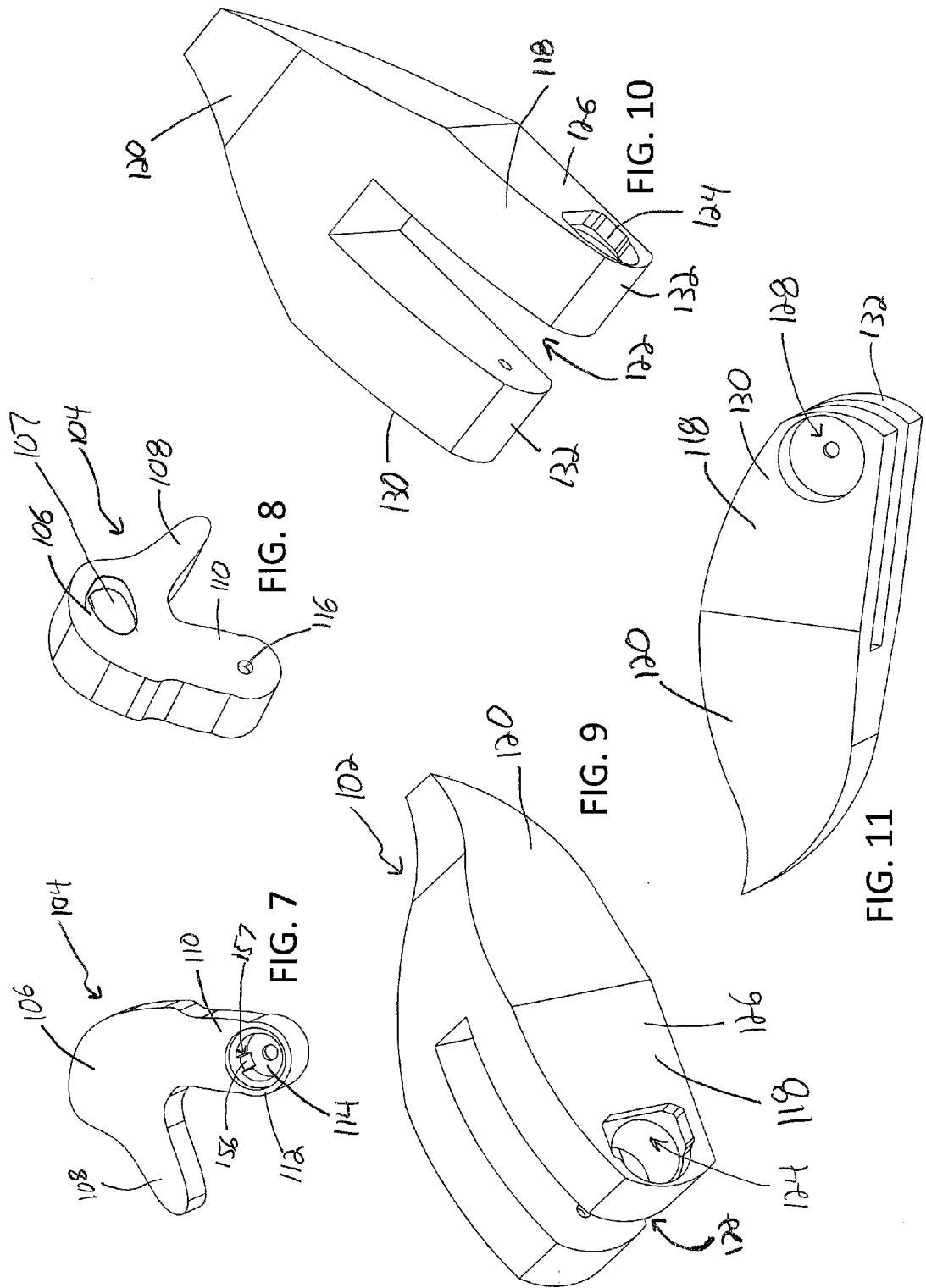

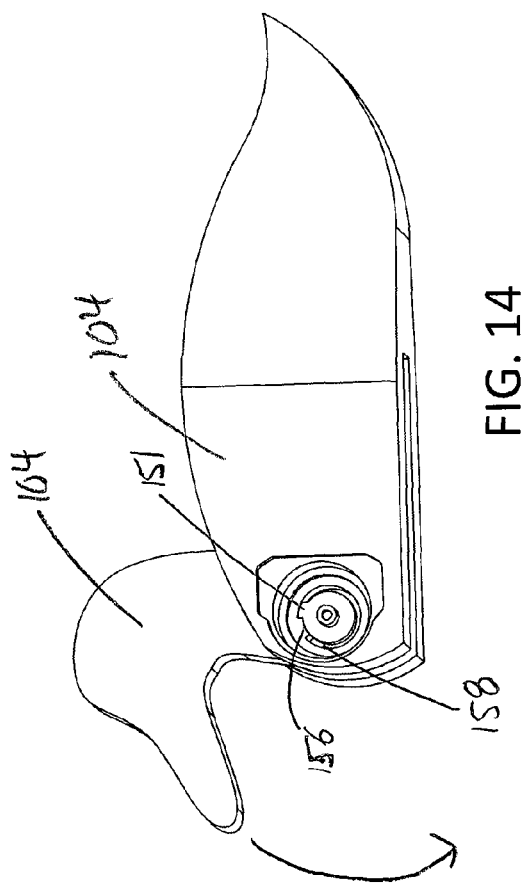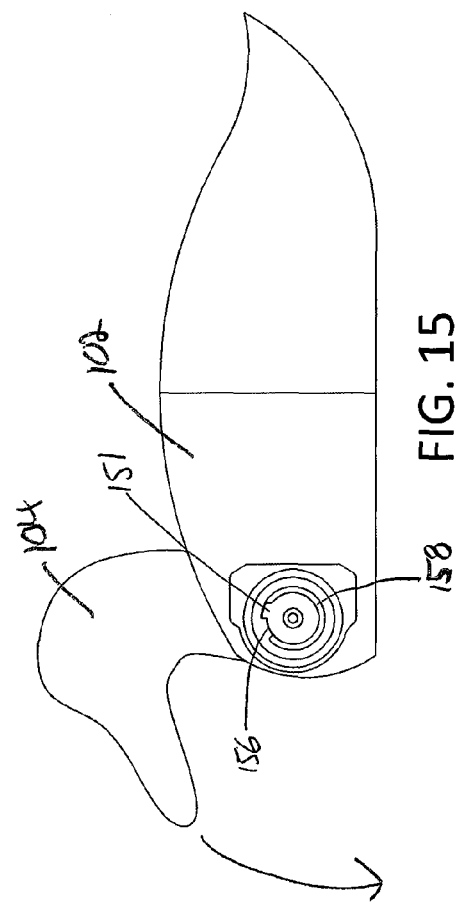

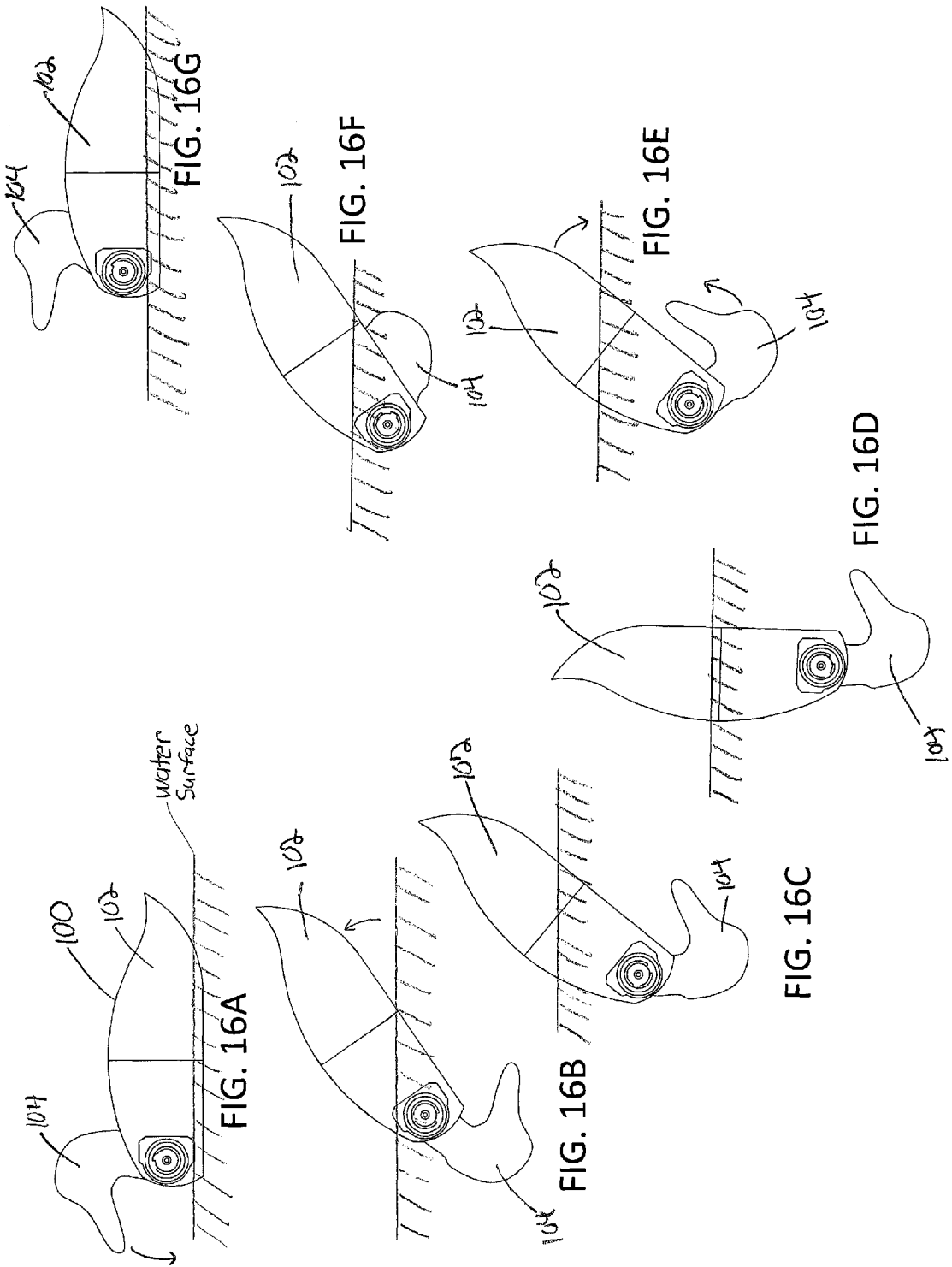

WATERFOWL DECOY WITH LIFELIKE FEEDING MOVEMENT

PRIORITY

This application is a continuation of U.S. patent application Ser. No. 13/826,684, filed on Mar. 14, 2013, which is hereby incorporated herein by reference in its entirety.

FIELD

The present invention relates generally to waterfowl decoys used for hunting and, more particularly, to waterfowl decoys that mimic real feeding behavior on the water.

BACKGROUND

Waterfowl hunting is a popular sport enjoyed by hundreds of thousands of individuals. The traditional style of waterfowl hunting is based on hunters attempting to lure waterfowl to fly within the effective range of the hunter's shotguns. The most common method for achieving this is for the hunter to place decoys resembling live waterfowl on the water in close proximity to the hunter's location.

One of the major problems experienced by waterfowl hunters is the lack of motion from traditional style static waterfowl hunting decoys. Live waterfowl are not attracted to decoys that are motionless on a smooth water surface. In fact, decoy spreads that have no movement can often spook wary waterfowl and hinder hunting success. Traditional decoys rely on wind for movement and waterfowl hunting often takes place on small impoundments or wetlands that need heavy winds to churn the surface of the water and move the decoys.

It is common knowledge among waterfowl hunters that motion decoys, those exhibiting some form of animation, are more likely to attract waterfowl than are traditional static decoys. For example, U.S. Pat. No. 6,553,709 discloses a duck decoy that includes a motorized head and a motorized tail propeller. The head motor turns a linkage that causes the head to bob vertically up and down. The propeller imparts propulsion and can cause splashing. While this motion decoy, like other similar examples, is an improvement over static decoys, the movement produced is not fully realistic of true waterfowl feeding behavior on the water.

As a result, there is a continuing need to provide for a waterfowl decoy, movement system and method that better mimics real feeding behavior on the water.

SUMMARY

The present addresses the problems discussed above by providing a decoy apparatus, system and method possessing movement that mimics lifelike feeding behavior of waterfowl. The decoy, according to certain embodiments, achieves this lifelike feeding motion through the rotation of a weighted decoy head propelled in a circular motion by a battery-powered electric motor. The weighted head rotates 360 degrees on a drive axle located at the front of the decoy. When the head reaches the upper apex of the rotation, a drive cam located on the drive shaft disengages from a cam located on the decoy head, thereby allowing the head to accelerate and plunge quickly into the water. This action simultaneously causes the rear of the decoy to rotate to a vertical orientation. The head pauses under water until the drive cam re-engages the head cam at the bottom point of the rotation and continues to rotate the head through a channel in the body. This redistribution of weight causes the body to return to a horizontal position. The head rotation continues to the apex and the cycle repeats. This motion of imitating a feeding waterfowl disturbs the surface of the water surrounding the decoy, which imparts motion to adjacent static waterfowl decoys.

The above summary of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 7 is a perspective view of a head of a waterfowl decoy in accordance with an embodiment of the present invention.

FIG. 8 is another perspective view of the head of FIG. 7.

FIG. 9 is a perspective view of a body of a waterfowl decoy in accordance with an embodiment of the present invention.

FIG. 10 is another perspective view of the body of FIG. 9.

FIG. 11 is another perspective view of the body of FIG. 9.

FIG. 14 is a perspective view of a waterfowl decoy in accordance with an embodiment of the present invention.

FIG. 15 is a side view of a waterfowl decoy in accordance with an embodiment of the present invention.

FIGS. 16A through 16G depict side views of a decoy in accordance with an embodiment of the present invention at different dipping/tipping orientations throughout a rotational cycle of the head.

Figure 1:
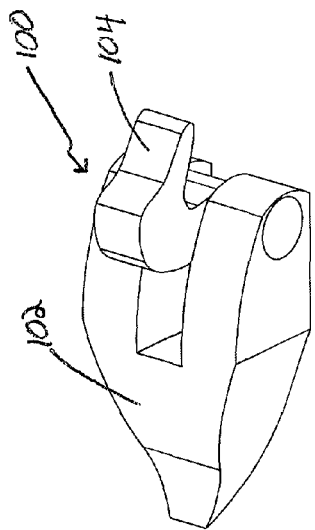
FIG. 1 is a perspective view of a waterfowl decoy in accordance with an embodiment of the present invention.
Figure 6:
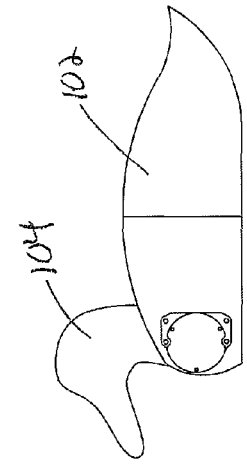
FIG. 6 is another side view of a waterfowl decoy in accordance with an embodiment of the present invention.
Figure 5:
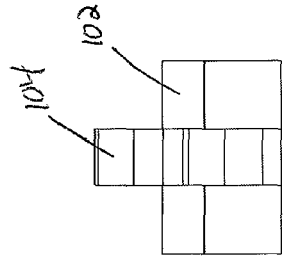
FIG. 5 is a front view of a waterfowl decoy in accordance with an embodiment of the present invention.
Figure 2:
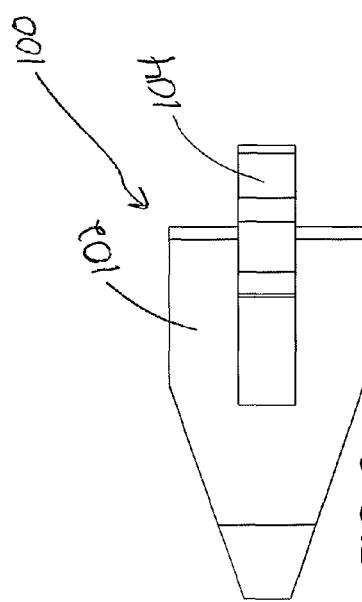
FIG. 2 is a top view of a waterfowl decoy in accordance with an embodiment of the present invention.
Figure 3:
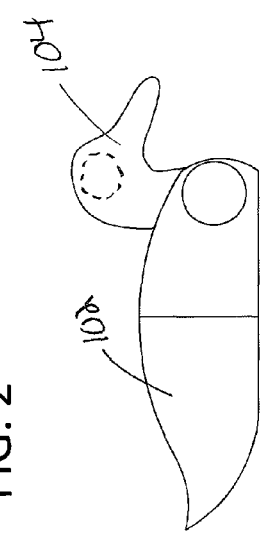
FIG. 3 is a side view of a waterfowl decoy in accordance with an embodiment of the present invention.
Figure 4:
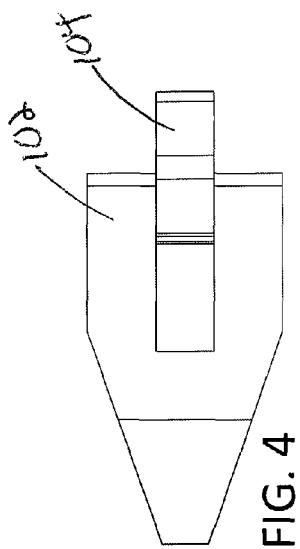
FIG. 4 is a bottom view of a waterfowl decoy in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims. For illustrative purposes, hatching or shading in the figures is provided to demonstrate sealed portions and/or integrated devices for the package.

DETAILED DESCRIPTION

In the following descriptions, the present invention will be explained with reference to various example embodiments; nevertheless, these embodiments are not intended to limit the present invention to any specific example, environment, application, or particular implementation described herein.

Therefore, descriptions of these example embodiments are only provided for purpose of illustration rather than to limit the present invention. It is understood that the features mentioned hereinbefore and those to be commented on hereinafter may be used not only in the specified combinations, but also in other combinations or in isolation, without departing from the scope of the present invention.

The decoy according to certain embodiments herein effectively mimics the feeding activities of dabbling ducks, Canada geese, and other waterfowl that forage for food beneath the water's surface. This movement, sometimes referred to as dabbling, includes the waterfowl tipping their bodies up in order to submerge their heads underwater. This is done so that they can forage the bottom of a wetland, submerged vegetation or aquatic life under the surface with their bill. Also, the motion of imitating a feeding waterfowl disturbs the surface of the water surrounding the decoy, which imparts motion to adjacent static waterfowl decoys.

Referring to FIGS. 1-6, a decoy device 100 is shown. The decoy 100 generally comprises a body 102 and a head 104. The decoy 100 can be sized, shaped and colored to resemble a wide variety of waterfowl species, including both ducks and geese, according to various embodiments of the invention. The body and head can be formed from a variety of materials, including plastic, wood, foam and rubber. Additional appendages such as wings and legs or feet can also be provided according to additional embodiments. The body and head can be colored using conventional means in order to best resemble the waterfowl of a given species and gender as may be desired by a given hunter.

Referring additionally to FIGS. 7 and 8, the head 104 comprises a central head portion 106, a bill portion 108 extending forwardly therefrom and a neck portion 110 extending downwardly from the central portion. A distal end portion 112 of the neck defines an aperture or recess 114 inward from the side surface to receive a portion of the motor shaft as will be discussed later herein. A second aperture 116 is defined in the opposing side surface and in communication with the recess 114 so that the head can be rotatably supported from both of its sides. A head weigh recess 107 is defined inward from one or both sides of the head for receiving a weight as will be discussed later herein. The weight could also be placed or formed inside of the head in another manner without departing from the scope of the invention.

The body 102 comprises a forward portion 118 and a rearwardly extending tail portion 120. The forward portion defines a center slot or channel 122 open to the front of the body and extending rearwardly through a substantial length of the body sufficiently to provide clearance for the height of the rotating head. The width of the channel 122 is sufficient to provide clearance for the width of the rotating head.

The body further includes a motor recess 124 defined inwards of a first side 126. The body also includes a battery recess 128 defined inward from an opposing second side 130. Both recesses are adjacent to the front end 132 of the body (end opposite the tail portion 120). Such location places the center of gravity of the decoy substantially forward of the physical midline so that tipping can easily be induced by head movement that will be described later herein.

Referring next to FIG. and 13, various internal components can be seen in exploded assembly view. The head weight 134 can be seen adjacent to the head weigh recess 107. The battery 136 and battery door or cover 138 are shown adjacent the battery recess. The battery recess need only be large enough to receive the battery 136. The door 138 can be secured with fasteners such as screws, can be threaded, or any other suitable means for sealing can be employed. The door 138 allows the battery recess to be sealed, but permits easy access to the battery for recharging or replacement. In one embodiment, the battery weighs approximately the same as the motor so that the decoy does not tip to one side when floating in the water.

An opposing or non-driven shaft 140 is inserted through the head recess 114 and aperture 116 and into a supporting aperture 141 defined in an inside surface of the channel opposite the battery-side outside surface 130. This shaft supports the rotation of the head opposite the motor.

A motor assembly is disposed inside of the motor recess 124. The motor assembly includes a motor 142 disposed inside of a motor housing 144. The motor is secured to a motor mount plate 146. The motor housing 144 is enclosed by a housing cap 148. A drive shaft 150 is rotatably secured to the motor's output shaft 143. A motor access cover or cap 152 is secured over the motor recess 124 to retain the motor assembly and prevent water and debris from entering the motor assembly. The motor is a gear motor or any other suitable type of mow-speed battery-driven motor. In one example embodiment, the motor is configured to rotate the head one complete turn every 3-5 seconds. However, longer and shorter rotation times are within the scope of the invention.

Figure 12:
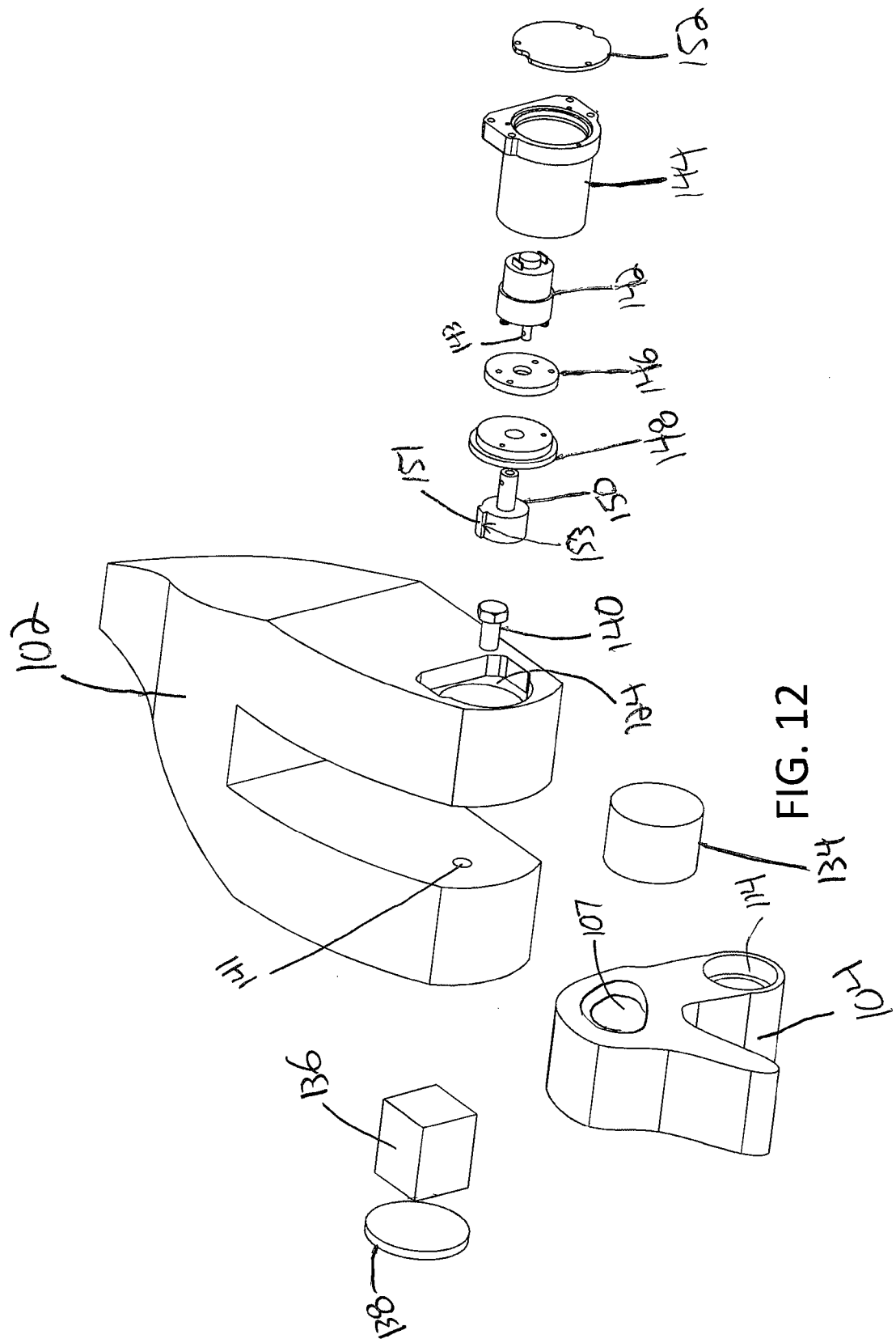
FIG. 12 is an exploded parts assembly perspective view of a waterfowl decoy in accordance with an embodiment of the present invention.
Figure 13:
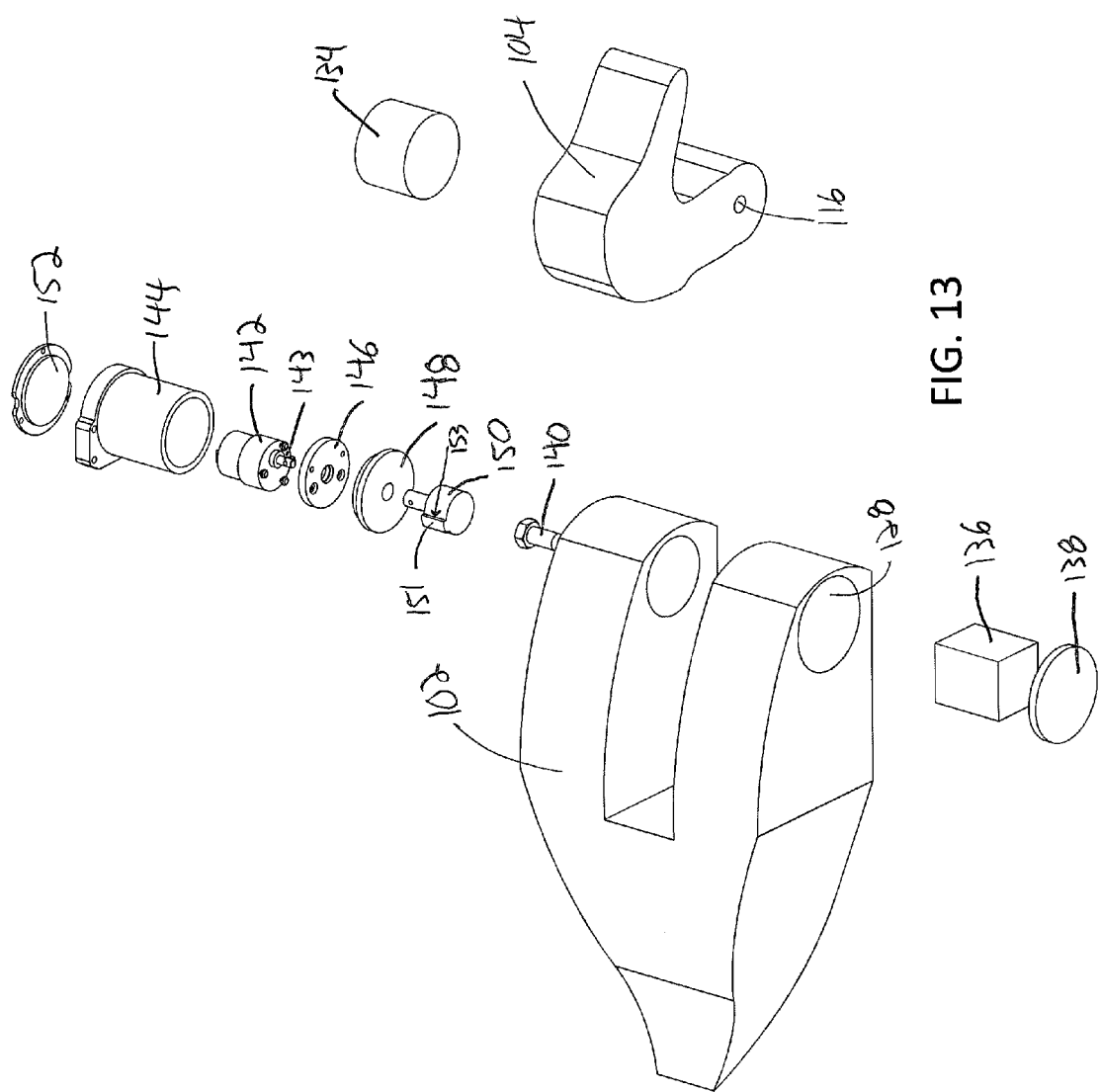
FIG. 13 is an exploded parts assembly perspective view of a waterfowl decoy in accordance with an embodiment of the present invention.

The drive shaft, as shown in FIGS. 12-13, includes a cam extension 151 raised above the outer surface of the drive shaft. The extension 151 defines a forward cam surface 153 that extends generally normal to the outer surface. Referring again to FIG. 7, the recess 114 in the head 102 includes a cam projection 156 extending inwardly from the inner circular surface of the recess. The cam projection defines a rear cam surface 157.

The respective cam features cooperate to drive the circular motion of the decoy head. Referring to FIGS. 14-15, the cam features 151 and 156 are shown in operational contact. The motor shaft is driven counterclockwise as shown and indicated in these figures. The forward cam surface 153 of the drive shaft 150 pushes against the rear cam surface 157 of the head recess 114 to cause the head to rotate in a central longitudinal plane of the decoy. Note, however, that the radius of the inner circular surface of the recess 114 is at least as large as the radius of the drive shaft at the cam extension 151. This relationship defines a gap 158 between the drive shaft outer surface and the recess inner surface except where the respective cam features 151 and 156 exist. As a result, the head is free to rotate faster, such as due to gravity, than the speed with which the motor is rotating until the cam features come into contact again. This permits the head to simulate realistic feeding behavior as will be described below.

The feeding motion will now be described with regard to FIGS. 16A through 16G. In 16A, the decoy 100 is shown with the head 104 at the top point of its rotational travel. The cam extension 151 is still contacting the head's cam projection 156 at this point as shown in the cut-away portion of the figure. Further rotation of the head past this apex point disengages the cam features and allows the head 104 to accelerate due to gravity so that the head rotates towards the water faster than the motor is rotating. This is permitted because the cam feature 156 of the head is unimpeded due to the gap 158 discussed above. This can also be seen by the relative separation of the cam features in FIG. 16B.

The dipping of the head under the water also imparts a tilting motion of the body as shown in FIG. 16B. The rotation of the head continues, as shown in FIG. 16C, due to gravity until it reaches the point that it becomes inverted as shown in FIG. 16D. The body tilt also continues as depicted until it reaches an approximate vertical orientation coinciding with the head becoming inverted. At this point, the decoy pauses momentarily while the motor's rotation catches up with the head position and the respective cam features again contact one another.

The motor now begins rotating the head to overcome the downward force imparted by gravity acting on the head. The direction of rotation does not change. Instead, as shown in FIGS. 16E, 16F and 16G, the head continues to rotate through the body channel 122 until arriving at the orientation depicted in FIG. 16A. The body tilt, however, reverses direction as the head continues to rotate from inversion back to its original orientation. The motion cycle then repeats.

The weight of the head can be adjusted to alter how quickly the head will dip under the water. More weight will cause a quicker dip motion. Weight also can be adjusted to alter the depth of the decoy submersion during tipping of the body. More weight will cause a deeper submersion.

In use, the decoy apparatus, system and method achieves a realistic feeding motion by allowing the head to fall freely in a downward direction. This action causes the head to plunge beneath the water's surface, simultaneously causing the rear of the decoy to rotate or tilt to a vertical position. The decoy will then bob in the water for a few seconds like a feeding waterfowl while the motor's rotation catches up to the head position. This combination of motions more closely resembles the actual motion made by a feeding duck, goose or other waterfowl species than is provided by conventional motorized decoys.

The motion of imitating a feeding waterfowl described herein also disturbs the surface of the water surrounding the decoy, which imparts motion to adjacent static waterfowl decoys.

This movement of the decoy apparatus, method and system described herein is attractive to other waterfowl species because it indicates that there is feed in the impoundment and that there is safety due to the fact that there are already waterfowl using the impoundment or wetland.

The decoy attracts other waterfowl visually in several ways: the flash of color from the decoy body when the quick movement is created from the weighted freefalling head, the ripples that are created on the surface of the water from the quick submerging head of the decoy and the resistance of the buoyant body of the decoy on the water's surface. The realistic motion of the decoy therefore sends several visual signals that attract flying ducks.

The repetitive cycle of the decoy action also indicates a food source and safety for live waterfowl that see the movement of the decoy and the ripples on the water surface.

In another aspect, the decoy according to the invention includes a self-contained drive mechanism and power supply. It requires no attention or movement from hunters using the decoy other than deploying it at the beginning of their hunt. No poles or flotation devices are required.

In an additional embodiment, the motor can be provided with a timer that will pause the decoy motion for a set time after a given number of head rotational cycles.

In still a further embodiment, the motor can be operationally connected to a remote-controlled on/off switch. This permits the user to safely start and stop the decoy rotation from a distance with a hand-held remote control.

The present invention may be embodied in other specific forms without departing from the spirit or essential attributes thereof, and it is, therefore, desired that the present embodiment be considered in all respects as illustrative and not restrictive. Those skilled in the art may recognize other equivalents to the specific embodiment described herein which equivalents are intended to be encompassed by the claims attached hereto.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of providing a motorized waterfowl decoy with a simulated lifelike waterfowl feeding behavior on a body of water, the decoy comprising a decoy head coupled to a decoy body, the method comprising:
    rotating the decoy head in a longitudinal plane of the decoy body through a full 360 degrees while passing through the decoy body; and
    creating a bobbing motion of the decoy on the body of water.

2. The method of claim 1, further comprising: accelerating the rotational rate of the decoy head as the head passes an apex of rotation and approaches the body of water.

3. The method of claim 1, further comprising: tipping the decoy body such that it is generally vertically aligned with a tail portion extending upwards when the decoy head reaches an inverted head position.

4. The method of claim 3, further comprising: pausing rotation of the decoy head at the inverted head position momentarily before continuing rotation of the decoy head.

5. The method of claim 1, further comprising generating ripples in the body of water by the decoy to impart motion to an adjacent static waterfowl decoy.

6. The method of claim 1, further comprising providing a weight to the decoy head.

7. The method of claim 1, further comprising disposing a motor and battery within the decoy body.

8. The method of claim 1, wherein a full rotation of the head through 360 degrees takes between 3 and 5 seconds.

9. A motorized waterfowl decoy with a simulated lifelike waterfowl feeding behavior on a body of water, comprising:
    a decoy body, including a longitudinal channel defined in the body from a front surface of the decoy and extending in a rearward direction
    a decoy head rotationally disposed in the longitudinal channel such that it can rotate through a full 360 degrees while passing though the longitudinal channel;
    a motor disposed in the body; and
    a weight disposed in the decoy head of a sufficient amount to cause a rearward portion of the decoy body to rise above a surface of the body of water to impart a bobbing motion to the decoy body as the decoy head rotates.

10. The decoy of claim 9, wherein the weight is sufficient to cause the decoy body to become vertically oriented in the body of water when the decoy head is in an inverted position.

11. The system of claim 9, wherein the decoy head is configured to decouple from the motor momentarily once reaching an inverted head position.

12. The system of claim 9, further comprising a battery disposed in the body, wherein the motor is disposed in the body adjacent a first longitudinal side surface of the body and the battery is disposed in the body adjacent an opposing second side surface of the body.

13. The system of claim 9, further comprising at least one removable access door provided to the decoy body.

14. The system of claim 9, further comprising a means for coupling the motor to the decoy head.

15. A waterfowl decoy apparatus with a simulated lifelike waterfowl feeding behavior on a body of water, comprising:
    a waterfowl decoy head, the head including a weight disposed therein;

a waterfowl decoy body coupled to the head such that the head can rotate in a longitudinal plane with respect to the body, the body including a longitudinal channel defined in the body from a front surface of the decoy body and extending in a rearward direction sufficient to provide clearance for the waterfowl decoy head to rotate through a full 360 degrees of rotation; and a motor disposed in the body and functionally coupled to the waterfowl decoy head, wherein, rotation of the waterfowl decoy head through the full 360 degrees of rotation causes the waterfowl decoy body to dabble in the water.

16. The apparatus of claim 15, wherein the waterfowl decoy head is weighted such that the decoy body is vertically oriented in a body of water when the head is in the inverted position.

17. The apparatus of claim 15, wherein the motor is functionally coupled to the waterfowl decoy head such that rotation of the waterfowl decoy head is momentarily paused when the waterfowl decoy head reaches an inverted position.

18. The apparatus of claim 15, further comprising a battery disposed in the waterfowl decoy body and located with respect to the motor such that the waterfowl decoy body is laterally balanced on the body of water.

19. The apparatus of claim 18, further comprising a removable door disposed over a motor access opening defined in the waterfowl decoy body.

20. The method of claim 15, wherein the motor is configured to rotate the waterfowl decoy head through 360 degrees every 3 to 5 seconds.

* * * * *